United States Patent Office 3,296,217
Patented Jan. 3, 1967

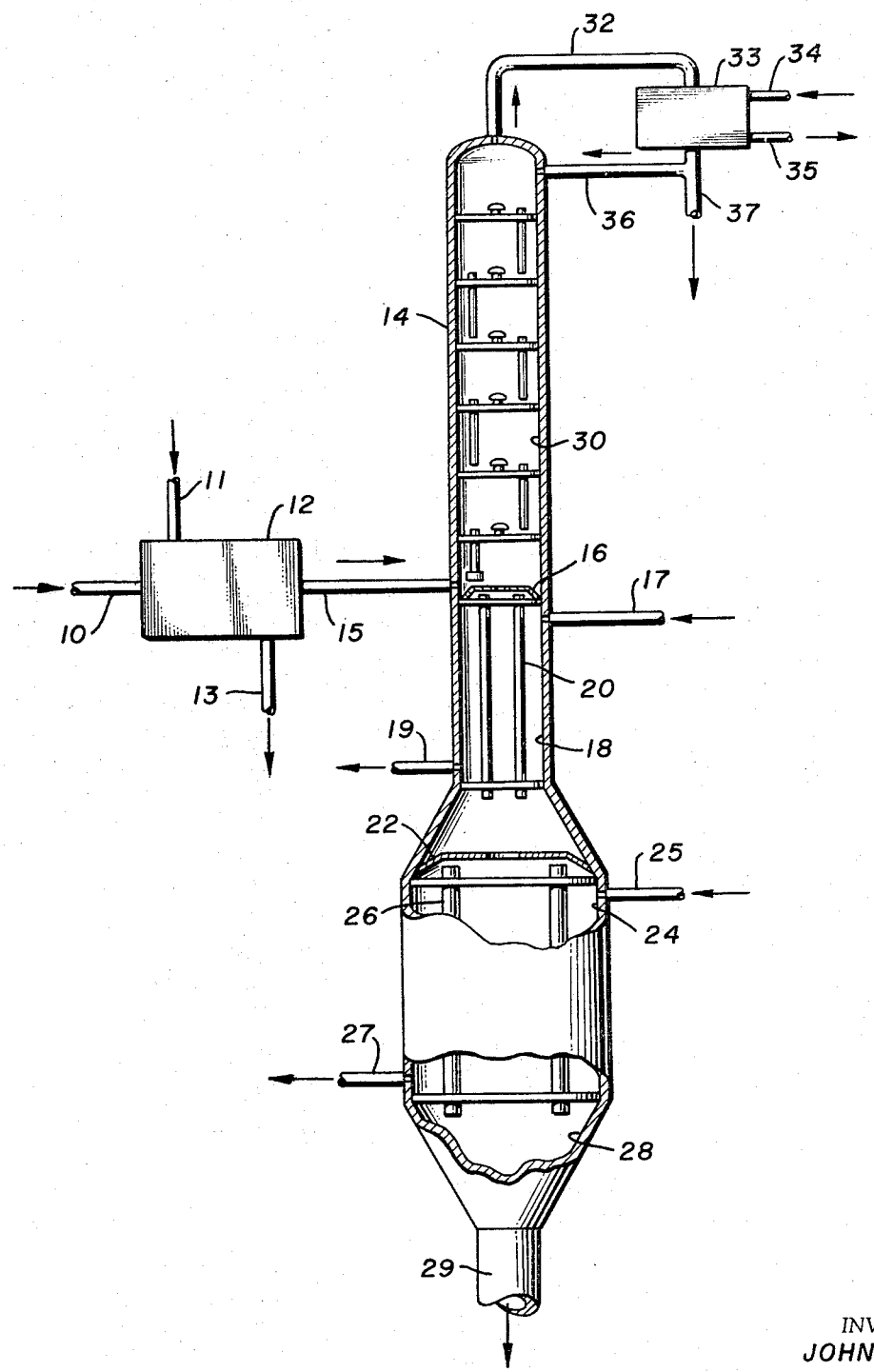

3,296,217
CONTINUOUS POLYMERIZATION PROCESS FOR POLYAMIDE PREPARATION
John E. Tate, Pensacola, Fla., assignor to Monsanto Company, St. Louis, Mo., a corporation of Delaware
Filed June 1, 1964, Ser. No. 371,421
2 Claims. (Cl. 260—78)

This invention relates to a process for producing polyamide having attractive film and fiber-forming properties. More particularly, it relates to a process for the production of polymeric hexamethylenediamine adipate from an aqueous precursory salt solution.

Polymeric hexamethylenediamine adipate may be produced in a batch process or in a process that lends itself to continuous operation. In the batch process there are disadvantages inherent from its very nature. A batch process is intermittent thus does not readily lend itself to large production rates. In the continuous processes now in use a textile quality polymer is quite difficult to achieve. In other words, batch processes produce relatively high quality polymer at the expense of high production rates while the converse is substantially true in the case of present day continuous polymerization processes. These customary continuous processes produce polymer at a reasonably high rate, but do not produce polymer having the relatively high textile quality producible in batch processes.

One of the major problems in most continuous polymerization processes for producing polymeric hexamethylenediamine adipate is efficient removal of water of solution and water of reaction from the polymerizing material. A second problem is polymer degradation at high production rates. To achieve exceptional speed in customary processes usually entails the use of high temperatures which tend to degrade polymer.

The dyeability of textile grade polymeric hexamethylenediamine adipate is extremely important. When using acid or basic dyes, dye depth is increased by the addition of an excess of a complementary salt forming base or acid. However, when the excess of base is to great a large number of spinneret drips is the undesirable result. Furthermore, it is extremely difficult in a batch process to reproduce, batch after batch, the same dye depth in polymeric hexamethylenediamine adipate.

Therefore, an object of this invention is to provide a process of the continuous polymerization of hexamethylenediamine adipate from an aqueous precursory salt.

Another object is the provision of a high production rate process for the continuous production of polymeric hexamethylenediamine adipate from an aqueous precursory salt wherein relatively low, i.e., non-degrading, temperatures are employed.

A still further object is the provision of a process wherein the inherent characteristics of polymeric hexamethylenediamine adipate, such as dyeability levels, may be substantially controlled.

Other objects will become apparent from the following descriptive material.

In general, the objects of this invention are achieved in the provision of a process wherein an aqueous solution of hexamethylenediamine adipate salt is flowed, in the form of a plurality of thin annular films, through a superatmospheric evaporating zone. This zone is usually operated at 195–240° C. and 90–130 pounds per square inch pressure. Flow through this zone usually takes 1–10 minutes. Substantially all of the water of solution is evaporated in this zone. The resulting substantially non-aqueous molten salt is then flowed through a second, prepolymer forming, zone in 1–15 minutes. This second zone has substantially the same superatmospheric pressure obtaining in the first zone and is at a temperature 250–300° C. A pre-polymer having a relative viscosity of less than 20 but usually greater than 3 relative viscosity units is produced by this second zone. After emitting from the pre-polymer forming zone, the relatively low viscosity pre-polymer is then fed to a polymer finishing zone to produce polymeric hexamethylenediamine adipate having film and fiber-forming properties.

The figure is a schematically drawn column and flow diagram generally illustrating the important features of the present invention.

Relative viscosity, as used herein, is the ratio of absolute viscosity (in centipoises) at 25° C. of a solution of nylon in 90% formic acid (90% formic acid and 10% water) to the absolute viscosity (in centipoises) at 25° C. of the 90% formic acid alone.

Pre-polymer is polymeric hexamethylenediamine adipate having a relative viscosity below about 20 relative viscosity units.

With reference now to the figure, an aqueous solution of hexamethylenediamine adipate is fed to pre-heater 12 through line 10. This solution usually has a concentration of 50 weight percent hexamethylenediamine adipate. However, this is just a customary concentration. The process may be used to polymerize solutions having variable salt concentrations therein, such as 40–60 weight percent. A heating medium, such as steam or Dowtherm, is fed to pre-heater 12 through line 11 and is withdrawn therefrom by line 13. Feed pre-heated to the preferred temperature, usually 100–190° C., is fed to column 14 by way of line 15. Feed in line 15 enters immediately above baffle 16 which distributes the flow. Baffle 16 directs the flow downwardly but not directly into vertical tubes 20. As a pool of feed forms around the openings of tubes 20 it lips or weirs over the tube entrances forming an annular film of descending solution inside the tubes. In other words the aqueous solution of hexamethylenediamine adipate flows by gravity as thin annular films on the inner surfaces of the vertically disposed tubes. A fluid heating medium is fed to the shell side of tubes 20 by means of line 17 and drawn away through line 19. This heating medium has a heat content sufficient to maintain evaporation zone 18 at 195–240° C. Steam, Dowtherm, or their equivalents may be used as a heat source.

As the aqueous salt solution passes through evaporation zone 18 water of solution and hexamethylenediamine are rapidly evaporated. Vapor is emitted from the surface of the thin liquid film into the space in the center of the tubes. These vapors then ascend to rectification zone 30 where by means of refluxing a certain diamine concentration is maintained in the system.

A substantially non-aqueous molten salt emits from the base of evaporation zone 18 and falls onto baffle 22. Baffle 22 performs the same function as baffle 16, preventing the direct flow of fluid into vertical tubes 26 and aiding in the formation of thin, annular liquid films of molten salt therein. In other words the molten material flows by gravity as thin annular films on the inner surfaces of the vertically disposed tubes 26. Pre-polymer forming zone 24 is heated in the same manner as evaporation zone 18, i.e., using steam, Dowtherm, or the like, which enters through line 25 and is withdrawn by line 27. In passing through pre-polymer forming zone 24 vaporous water and hexamethylenediamine are driven off as the polymerization reaction proceeds. As they are emitted these vapors ascend through the center of tubes 26 and through tubes 20 in evaporation zone 18 until they enter rectification zone 30. These vapors, of course, are additive to those yielded by evaporation zone 18. Vapor flows in line 32 to condenser 33 to be therein liquified. Water in heat exchanging relation flows into the condenser through line 34 and exits via line 35. A portion of the flow is returned as reflux to the rectification zone via line 36 while a liquid made substantially comprised of water is taken off by line 37. As before noted, refluxing is for the purpose of controlling the hexamethylenediamine level.

Pre-polymer formed in zone 24 descends to collection zone 28. From here it flows via line 29 to a polymer finisher which produces a polymer having attractive film and fiber-forming properties.

A representative sample of pre-polymer formed according to the process of this invention is one having a molecular weight of about 4500, melt point of near 257° C., and a viscosity of 6 relative viscosity units.

The rectification column in the drawing is represented as a plate column but, of course, it is obvious that any other rectification column that would perform the same function would be adequate.

Evaporation in evaporation zone 18 requires 1–10, usually 2–3, minutes to produce a molten salt that is substantially non-aqueous. This salt can have aqueous water remaining therein but this procedure entails a higher heat load for the pre-polymer forming zone and is usually not preferred.

Pre-polymer forming zone 24 requires the provision of a heating medium having sufficient heat content to yield a temperature in the range of 250–300° C., preferably 275–285° C. To form pre-polymer requires from 1–15 minutes holdup in the pre-polymer zone, depending upon the level of polymerization that is desired. To produce a preferred pre-polymer usually requires 4–6 minutes.

An example of a polymer finisher useful in completing the polymerization of the pre-polymer is one operating at 280° C. and atmospheric pressure. The finisher requires approximately 30 minutes at this temperature and pressure. It must be recognized that this is not the only method of finishing. Finishers employing different conditions therein are quite acceptable.

Pressure in column 14 may range from atmospheric to 250 p.s.i.g. However, in employing atmospheric pressure and a $COOH/NH_2$ end group ratio near one (1) an unexplained problem arises. Pre-polymer polymerized at this pressure forms an extremely viscous polymer that will flow at extraordinarily slow rates even though the relative viscosity is relatively low. It almost has the consistency of a solid. To produce pre-polymer as hereinbefore described, i.e., between 3 to 20 relative viscosity units, requires the use of high pressures. Advantageously the system should be operated between 90–130 p.s.i.g. to to produce a suitable pre-polymer.

Surprisingly, it has been found that polymer finishing rate can be determined, in a large measure, by the conditions in the pre-polymerization procedure, i.e., temperature, pressure and reflux ratio. Reflux ratio largely determines the ratio of acid to base end groups in the polymer. As the ratio of $COOH/NH_2$ end groups in the pre-polymer approaches one (1) from either side the polymer finishing rate increases to a marked degree. For example, at a 1.15 $COOH/NH_2$ end group ratio a pre-polymer having a viscosity of 9.14 relative viscosity units finished to a polymer having a viscosity of 133 relative viscosity units in 40 minutes. This same pre-polymer finished to a polymer having a viscosity of 105 relative viscosity units in only 10 minutes. The finishing conditions used in both examples were those generally considered normal, i.e., atmospheric pressure, slow stirring, and 280° C.

Most pre-polymer produced according to customary methods has a 1.2 to 1.6 $COOH/NH_2$ end group ratio. In the instant procedure the operable range may be from 0.5 to 2.0 $COOH/NH_2$ end group ratio. Therefore, the process may be so operated as to produce a pre-polymer that will finish at very high rates. Furthermore, a base or acid end group dominated polymer may be produced without adding acid or base additives. Thus, the dye level for both acid and basic dyes may be controlled by judicious choice of process conditions rather than through the use of additives.

When polymer is made basic by adding an excess of hexamethylenediamine to thereby enhance the acid dye depth of the polymer, the result is highly excessive spinneret drips. Surprisingly, deep-dyeing polymer produced in accordance with the instant process—not using additives—does not have this excessive spinneret drip problem. Reflux, by holding partial vapor pressure of hexamethylenediamine at certain levels, primarily controls the end group ratio in the pre-polymer and resultant polymer, thereby controlling the dye depth in said resultant polymer. As hexamethylenediamine is withdrawn the polymer finishing rate decreases and dye depth decreases. This assumes, of course, that the $COOH/NH_2$ end group ratio is greater than one (1). If the ratio $COOH/NH_2$ end group is, for example, 0.5 and the concentration of hexamethylenediamine is decreased then the polymer finishing rate will increase until a maximum finishing rate at a $COOH/NH_2$ ratio of one (1) is reached while the acid dye depth will decrease. When the ratio becomes greater than one (1) the basic dye depth will increase. Outside certain limits, about 0.6 to 1.6 $COOH/NH_2$ end group ratios, polymer finishing rates reach such low levels that the process becomes uneconomical.

In customary polymer finishers after an extended period of use "gel" forms in the bottoms thereof. Pre-polymer produced in accordance with the instant process substantially eliminates this problem. After extended use a barely detectable quantity of "gel" was noted on visual inspection of a dismantled finisher that had been used to produce finished polymer from the pre-polymer of this invention.

It must be recognized that nylon salt polymerized in accordance with the instant procedure has as integral parts thereof additives such as titanium dioxide and the like.

The invention is further illuminated by the following example. This example is for purposes of illustration and is not to be construed as limiting in any way.

EXAMPLE

Twenty pounds per hour of feed is fed to heat exchanger 12. This feed consists of a 50 weight percent aqueous solution of hexamethylenediamine adiptate. Steam at 200° C. heats the feed to 175° C. prior to entering the column next above baffle 16. The feed then passes to the entrance of evaporation zone 18 where the temperature is 187° C. Heat is supplied to zone 18 by 192° C. steam. After passing through zone 18 the substantially molten salt passes to pre-polymer forming zone 24 whose temperature at the entrance is 242° C. Heat is supplied to this zone by 283° C. Dowtherm. Pre-polymer emits at the base of zone 24 where the temperature is 280° C. and the pressure is 130 p.s.i.g. This pre-polymer, emitting at the rate of 10 pounds per hour, has a relative viscosity of 8.34, melt point of 255° C., $206 \times 10^{-6}$ COOH equivalents per million grams of polymer and $200 \times 10^{-6}$ $NH_2$ equivalents per million grams of polymer.

Rectifying zone 30 has a head temperature of 178° C. and a head pressure at 130 p.s.i.g. An overhead stream 32 having a flow rate of 20 pounds per hour is produced. The overhead in line 32 is condensed by a water cooled condenser. Half of stream 32 is refluxed while the other is removed as make in line 37.

Reflux in line 36 is at 53° C., the same as the make in line 37. The make is almost entirely comprised of water having 0.07 weight percent solids, 0.22 weight percent hexamethylenediamine and 2 parts per million ammonia ($NH_3$) therein.

It is obvious that many advantages are presented by the present invention. A very high grade deep dyeing polymer is produced without the use of additives. The process is quite fast usually requiring less than 10 minutes to produce pre-polymer. There are no moving parts in the process thus substantially eliminating costly mechanical breakdowns. And, of course, the process is continuous with all the inherent advantages, such as a smaller labor force, of continuous processes.

Although the invention has been described with reference to specific embodiments, it is to be understood that it is not to be limited thereto but is to be broadly construed and restricted solely by the scope of the appended claims.

I claim:
1. A process for the preparation of polymeric hexamethylene adipamide from a precursory aqueous salt solution comprising the steps of:
   (a) gravitationally flowing said aqueous salt solution as a thin annular film on the inner surface of a plurality of vertical tubes through a first zone at a pressure of from 90 to 130 pounds p.s.i.g. and at a temperature of from 195 to 240° C. for a period of from 1 to 10 minutes, thus removing substantially all of the water of solution;
   (b) gravitationally flowing the substantially non-aqueous salt solution from step (a) as an annular film on the inner surface of a plurality of vertical tubes through a second pre-polymer forming zone at a pressure of from 90 to 130 p.s.i.g. and at a temperature of from 250 to 300° C. for a period of from 1 to 15 minutes to produce a pre-polymer having a viscosity of between 3 to 20 relative viscosity units;
   (c) rectifying water and hexamethylenediamine evolved from said first zone and said second zone in a rectification zone communicating with said first zone and said second zone and controlling the concentration of hexamethylenediamine in both said first zone and said second zone to maintain a $COOH/NH_2$ polymer end group ratio of about 0.6 to 1.6; and
   (d) finishing said pre-polymer to a polymer in a heated polymer finishing zone to produce a polymeric hexamethylenediamine adipate having fiber forming properties.

2. The process of claim 1 wherein the pressure in the said first zone and the said second zone is from 90 to 250 pounds per square inch gauge.

References Cited by the Examiner
UNITED STATES PATENTS
| | | | |
|---|---|---|---|
| 3,027,355 | 3/1962 | Taul et al. | 260—78 |
| 3,044,993 | 7/1962 | Tiemersma | 260—78 |
| 3,193,535 | 7/1965 | Carter | 260—78 |
| 3,218,297 | 11/1965 | Sovereign | 260—78 |
| 3,244,485 | 4/1966 | Coggeshall | 260—78 |

FOREIGN PATENTS
| | | |
|---|---|---|
| 1,293,914 | 4/1962 | France. |
| 614,625 | 12/1948 | Great Britain. |
| 854,223 | 11/1960 | Great Britain. |
| 890,437 | 2/1962 | Great Britain. |

WILLIAM H. SHORT, *Primary Examiner.*

H. D. ANDERSON, *Assistant Examiner.*